United States Patent
Chu et al.

(10) Patent No.: US 11,538,596 B1
(45) Date of Patent: Dec. 27, 2022

(54) SACRIFICIAL CONCRETE FOR CORE CATCHER AND PREPARATION METHOD THEREOF

(71) Applicant: Nanjing Forestry University, Nanjing (CN)

(72) Inventors: Hongyan Chu, Nanjing (CN); Jinyang Jiang, Nanjing (CN); Fengjuan Wang, Nanjing (CN); Li Gao, Nanjing (CN); Jianjian Qin, Nanjing (CN); Wenfang Shi, Nanjing (CN); Qun Wang, Nanjing (CN)

(73) Assignee: NANJING FORESTRY UNIVERSITY, Nanjing (CN)

( * ) Notice: Subject to any disclaimer, the term of this patent is extended or adjusted under 35 U.S.C. 154(b) by 0 days.

(21) Appl. No.: 17/501,313

(22) Filed: Oct. 14, 2021

(30) Foreign Application Priority Data

Sep. 23, 2021 (CN) .......................... 202111111021.7

(51) Int. Cl.
*G21C 9/016* (2006.01)
*C04B 28/04* (2006.01)
*C04B 111/00* (2006.01)

(52) U.S. Cl.
CPC .............. *G21C 9/016* (2013.01); *C04B 28/04* (2013.01); *C04B 2111/00862* (2013.01)

(58) Field of Classification Search
CPC ..................... G21C 9/016; C04B 28/04; C04B 2111/00862
See application file for complete search history.

(56) References Cited

FOREIGN PATENT DOCUMENTS

| CN | 108840626 A | | 11/2018 | | |
| CN | 109592951 A | * | 4/2019 | ............. | C04B 28/06 |
| CN | 112299798 A | | 2/2021 | | |
| WO | WO-2014025136 A1 | * | 2/2014 | ............. | C04B 28/06 |

OTHER PUBLICATIONS

English machine translation of CN 109592951A (Year: 2019).*

* cited by examiner

*Primary Examiner* — John E Uselding
(74) *Attorney, Agent, or Firm* — WPAT, PC

(57) ABSTRACT

A sacrificial concrete for a core catcher and a preparation method thereof are provided. The sacrificial concrete includes raw materials in parts by weight as follows: cement, 575~625 parts; a quartz sand, 1200~1300 parts; a hematite ore, 700~800 parts; water, 200~220 parts; a water reducing agent, 7~10 parts; and strontium oxide, 0~10 parts. The process of the preparation method is simple, and the sacrificial concrete with excellent performances of fluidity, strength and high-temperature resistance can be prepared by the known mixing technology. The sacrificial concrete can reduce releasing of radioactive substances $^{89}$Sr and $^{90}$Sr, so as to improve safety of nuclear power plants in case of a severe accident. Moreover, the sacrificial concrete can be used not only in a core catcher of current third generation nuclear power plant, but also in a core catcher of future fourth generation nuclear power plant, and has widespread engineering application value.

6 Claims, No Drawings

SACRIFICIAL CONCRETE FOR CORE CATCHER AND PREPARATION METHOD THEREOF

FIELD OF THE DISCLOSURE

The disclosure relates to nuclear power materials, and more particularly to a sacrificial concrete for a core catcher and a preparation method thereof.

BACKGROUND OF THE DISCLOSURE

In modern nuclear power engineering, the use of core catchers can provide additional protective shields for nuclear power plants, so as to improve the safety of nuclear power plants. In case of a severe nuclear power accident, the core catchers in the vessel are intended for reception, localization and cooldown molten core corium. Sacrificial concrete is a main component of the core catchers, which plays an important role in the cooling and localization of molten core corium. Although a certain number of documents at domestic and abroad have disclosed preparation technology of the sacrificial concrete, the sacrificial concrete prepared by current technology has problem of poor high temperature resistance. In case of severe nuclear power accident, the temperature of molten core corium can reach more than 3000° C., so the service environment temperature of the sacrificial concrete is very high. If the high temperature resistance of the sacrificial concrete is poor, its residual compressive strength will be reduced and its service life will be shortened under the action of high temperature. In addition, the poor high temperature resistance of the sacrificial concrete will also lead to the increase of its internal porosity, which will lead to a high melting rate, resulting in increased risk of radioactive material leakage in case of severe nuclear power accidents.

SUMMARY OF THE DISCLOSURE

In order to overcome shortcomings of the prior art, an objective of the disclosure is to provide a sacrificial concrete for a core catcher and a preparation method thereof.

In order to achieve the above-mentioned purpose, the disclosure discloses a sacrificial concrete for core catcher and a preparation method thereof. Specifically, the sacrificial concrete is mainly prepared from raw materials in parts by weight as follows:

cement, 575~625 parts; a quartz sand, 1200~1300 parts; a hematite ore, 700~800 parts; water, 200~220 parts; a water-reducing agent, 7~10 parts; and strontium oxide, 0~10 parts.

In an embodiment of the disclosure, the cement is aluminate cement with a $Al_2O_3$ content greater than or equal to 75% and a $SiO_2$ content less than or equal to 0.5%.

In an embodiment of the disclosure, the quartz sand is high-quality quartz powder with a $SiO_2$ content greater than or equal to 99% and a particle size greater than 0 millimeter (mm) and less than or equal to 5 mm.

In an embodiment of the disclosure, the hematite ore is high-quality hematite ore with a $Fe_2O_3$ content greater than or equal to 92% and a particle size of 5 mm~8 mm.

In an embodiment of the disclosure, the water is tap water or drinking water, and for example the water meets requirements of Chinese "standard of water for concrete" of JGJ63-2006.

In an embodiment of the disclosure, the water-reducing agent is a polycarboxylate superplasticizer, an appearance of the polycarboxylate superplasticizer is in a range from colorless to light yellow, a density of the polycarboxylate superplasticizer is in a range of 1.05~1.15 grams per milliliter (g/ml), a solid content of the polycarboxylate superplasticizer by mass is greater than or equal to 40%, a pH value of the polycarboxylate superplasticizer is 4±2 (i.e., in a range of 2~6), and a water reducing rate of the polycarboxylate superplasticizer is greater than or equal to 30%.

In an embodiment of the disclosure, the strontium oxide is powder with a SrO content greater than or equal to 95%.

Further, a preparation method of a sacrificial concrete for a core catcher is provided, and may include the following steps:

step (1), mixing cement, quartz sand and strontium oxide evenly to obtain a mixed material M1;

step (2), adding hematite ore into the mixed material M1 and stirring to obtain a uniform mixed material M2; and step (3), adding a mixed solution of water and water reducing agent into the uniform mixed material M2 and stirring to obtain a uniform mixed material M3, and then molding and curing to thereby obtain a sacrificial concrete for a core catcher.

In an embodiment of the disclosure, the step (1) may specifically include: adding the cement, the quartz sand and the strontium oxide into a single horizontal shaft forced concrete mixer; and controlling a stirring speed as 40~50 revolutions per minute (rpm) and a stirring time as 5~8 minutes (min), to thereby obtain the mixed material M1; and the step (2) may specifically include: adding the hematite ore into the mixed material M1, and controlling a stirring time as 6~8 min, to thereby obtain the mixed material M2;

the step (3) may specifically include: mixing half of the water with all of the water reducing agent firstly and stirring evenly to obtain a uniform mixed solution, and then adding the uniform mixed solution into the mixed material M2, using the other half of the water to clean a container containing the water reducing agent and then add into the mixed material M2, and controlling a mixing time as 8~12 min; and then performing the molding and curing to thereby obtain the sacrificial concrete.

Compared with the prior art, the sacrificial concrete for the core catcher prepared by the disclosure has high workability, its slump flow is greater than 560 mm, and meets fluidity requirements of self-compacting concrete. Compressive strength of the sacrificial concrete is greater than 40 megapascals (MPa), which is more than 33% higher than 30 MPa required in the prior art, which can significantly improve durability and prolong service life of the sacrificial concrete. The relative residual compressive strength of the sacrificial concrete at 1000° C. is more than 30%, which is more than 10% higher than the prior art, and its high temperature resistance has been greatly improved. Moreover, compared with the prior art, the sacrificial concrete can reduce release of radioactive substances $^{89}Sr$ and $^{90}Sr$ in case of a severe accident.

Compared with the prior art, the embodiments of the disclosure may further have the following beneficial effects. The preparation process of the disclosure is simple, and the sacrificial concrete with excellent fluidity, strength and high temperature resistance can be prepared by using conventional mixing technology. The sacrificial concrete for the core catcher prepared by the disclosure has excellent workability and is convenient for engineering construction. The relative residual compressive strength of the sacrificial concrete has been greatly improved, and its high temperature resistance has been significantly improved. SrO added into the sacrificial concrete can reduce the release of radioactive substances $^{89}$Sr and $^{90}$Sr in case of the severe accident. Moreover, the sacrificial concrete prepared by the disclosure can be used not only in a core catcher of the current third generation nuclear power plant, but also in a core catcher of the future fourth generation nuclear power plant, and has widespread engineering application value.

DETAILED DESCRIPTION OF EMBODIMENTS

The disclosure will be further described below in combination with specific embodiments. It should be understood that these embodiments are only used to illustrate the disclosure and not to limit the scope of the disclosure. After reading the disclosure, modifications of various equivalent forms of the disclosure by those skilled in the related art fall within the scope limited by the claims attached to the disclosure. In addition, experimental results of the illustrated embodiments are compared to emphasize advantages of the disclosure.

Raw materials used in the illustrated embodiments meet requirements as follows.

Cement is CA80 aluminate cement with a $Al_2O_3$ content of 77.8% and a $SiO_2$ content of 0.37%.

Quartz sand is high-quality quartz powder with a $SiO_2$ content of 99.3% and a particle size greater than 0 millimeter (mm) and less than or equal to 5 mm.

Hematite ore is a high-quality hematite ore with a $Fe_2O_3$ content of 94.1% and a particle size of 5 mm-8 mm.

Water is tap water.

Water reducing agent is a polycarboxylate superplasticizer with a light-yellow appearance, a density of 1.10 grams per milliliter (g/ml), a solid content of 45.5%, pH value of 5 and a water reducing rate of 33.5%.

Strontium oxide is powder with a SrO content of 96.4%.

Embodiment 1

Specifically, a sacrificial concrete for a core catcher may include ingredients in parts by weight as follows:
 cement, 600 parts;
 quartz sand, 1250 parts;
 hematite ore, 750 parts;
 water, 210 parts;
 water reducing agent, 8 parts; and
 strontium oxide, 0 part.

Specifically, a preparation method of the sacrificial concrete may include the following steps:
 step (1), weighing the required materials, including the cement, the quartz sand, the hematite ore, the water and the water reducing agent;
 step (2), wetting a single horizontal shaft forced concrete mixer and all tools and molds required;
 step (3), adding the weighed cement and the weighed quartz sand into the single horizontal shaft forced concrete mixer successively, controlling stirring speed as 45 revolutions per minute (rpm) and mixing for 6 minutes (min), and stirring evenly to thereby obtain a mixed material M1;
 step (4), adding the weighed hematite ore into the mixed material M1 by the step (3), mixing for 7 min, stirring evenly to thereby obtain a mixed material M2; and
 step (5), mixing half of the weighed water with all of the weighed water reducing agent firstly and stirring evenly to obtain a uniform mixed solution, and then adding the uniform mixed solution into the mixed material M2, using the other half of the weighed water to clean a container containing the water reducing agent and then adding into the mixed material M2, and controlling a mixing time as 8~12 min; and then performing molding and curing to thereby obtain the sacrificial concrete.

Embodiment 2

Specifically, a sacrificial concrete for a core catcher may include ingredients in parts by weight as follows:
 cement, 595 parts;
 quartz sand, 1250 parts;
 hematite ore, 750 parts;
 water, 210 parts;
 water reducing agent, 8 parts; and
 strontium oxide, 5 parts.

Specifically, a preparation method of the sacrificial concrete may include the following steps:
 step (1), weighing the required materials, including the cement, the quartz sand, the hematite ore, the water, the water reducing agent and the strontium oxide;
 step (2), wetting a single horizontal shaft forced concrete mixer and all tools and molds required;
 step (3), adding the weighed cement, the weighed quartz sand and the weighed strontium oxide into the single horizontal shaft forced concrete mixer successively, controlling a mixing speed as 45 rpm, mixing for 6 min, and stirring evenly to thereby obtain a mixed material M1;
 step (4), adding the weighed hematite ore into the mixed material M1 by the step (3), mixing for 7 min, stirring evenly to thereby obtain a mixed material M2; and
 step (5), mixing half of the weighed water with all of the water reducing agent firstly and stirring evenly to obtain a uniform mixed solution, and then adding the uniform mixed solution into the mixed material M2; using the other half of the weighed water to clean a container containing the water reducing agent and then add the half of the weighed water into the mixed material M2, and controlling a mixing time as 10 min; and then performing molding and curing to thereby obtain the sacrificial concrete.

Embodiment 3

Specifically, a sacrificial concrete for a core catcher may include ingredients in parts by weight as follows:
 cement, 590 parts;
 quartz sand, 1250 parts;
 hematite ore, 750 parts;
 water, 210 parts;
 water reducing agent, 8 parts; and
 strontium oxide, 10 parts.

Specifically, a preparation method of the sacrificial concrete may include the following steps:
 step (1), weighing the required materials, including the cement, the quartz sand, hematite ore, the water, the water reducing agent and the strontium oxide;
 step (2), wetting a single horizontal shaft forced concrete mixer and all tools and molds required;
 step (3), adding the weighed cement, the weighed quartz sand and the weighed strontium oxide into the single horizontal shaft forced concrete mixer successively, controlling mixing speed as 45 rpm, mixing for 6 min, and stirring evenly to thereby obtain a mixed material M1;
 step (4), adding the weighed hematite ore into the mixed material M1 by the step (3), mixing for 7 min, stirring evenly to thereby obtain a mixed material M2; and
 step (5), mixing half of the weighed water with all of the weighed water reducing agent firstly and stirring evenly to a uniform mixed solution, and then adding the uniformed mixed solution into the mixed material M2; using the other half of the weighed water to clean a container containing the water reducing agent and then add the other half of the weighed water into the mixed material M2, and controlling a mixing time as 10 min; and then performing molding and curing to thereby obtain the sacrificial concrete.

The above-mentioned three illustrated embodiments have exactly the same preparation process. The difference is that 600 parts of cement and 0 parts of strontium oxide in the embodiment 1, 595 parts of cement and 5 parts of strontium oxide in the embodiment 2, 590 parts of cement and 10 parts of strontium oxide in the embodiment 3. In the three illustrated embodiments, the total mass of cement and strontium oxide is 600 parts, and the content of strontium oxide increases in turn.

Performance Test

Workability of the sacrificial concretes in the above-mentioned embodiments is measured according to the Chinese national standard GB/T 14902-2012 (Ready-mixed concrete), and measurement index is slump flow. 28-day compressive strength of the sacrificial concrete is measured according to the Chinese national standard GB/T 50107-2010 (Standard for evaluation of concrete compressive strength). Specifically, the sacrificial concrete specimens cured for 28 days are heated in a muffle furnace, heating rate is set to 5° C./min, after heating to 1000° C., the sacrificial concrete specimens are kept at a constant temperature of 1000° C. for two hours, then cooled in a muffle furnace and cooled to room temperature, and the compressive strength is measured. Relative residual compressive strength of the sacrificial concrete is a ratio of the compressive strength at 1000° C. to the compressive strength at room temperature. Enthalpy of the sacrificial concrete is measured according to a comprehensive thermogravimetric analysis experiment, decomposition temperature of the sacrificial concrete is measured according to a high temperature experiment, and decomposition enthalpy of the sacrificial concrete can be obtained by combining the two experiments. The experimental results of the three illustrated embodiments are shown in Table 1 below.

TABLE 1

Measurement results

|  | Slump flow (mm) | 28-day compressive strength (MPa) | Relative residual compressive strength (%) | Decomposition enthalpy (kJ/kg) |
|---|---|---|---|---|
| Embodiment 1 | 583 | 43.4 | 35.3 | 650.9 |
| Embodiment 2 | 571 | 41.7 | 32.4 | 646.3 |
| Embodiment 3 | 564 | 40.3 | 31.1 | 637.5 |

It can be seen from the table 1 above that the slump flow of the sacrificial concrete in the three illustrated embodiments is greater than 560 mm, which meets the requirements of workability of self-compacting concrete. In the three illustrated embodiments, the minimum 28-day compressive strength of the sacrificial concrete is 40.3 MPa, which is 34.3% higher than the 30 MPa required in the prior art, indicating that its durability is improved, so its service life can be prolonged. In the three illustrated embodiments, the relative residual compressive strengths of the sacrificial concrete are more than 30%, which are more than 10% higher than that of the prior art, indicating that its high temperature resistance has been greatly improved. In three illustrated embodiments, the decomposition enthalpies of the sacrificial concrete are higher than that of the prior art, which indicates that its melting rate is lower than that of the prior art, which can improve the safety of nuclear power plants.

Regarding the influence of SrO added into sacrificial concrete on radioactive substances $^{89}$Sr and $^{90}$Sr in gas in case of severe accidents, due to ultra-high temperature and ultra-high radiation characteristics of the experiment, prototype experiments cannot be carried out at present. However, according to the results of numerical simulation experiments, compared with the embodiment 1, the release of radioactive substances $^{89}$Sr and $^{90}$Sr in the embodiment 2 and the embodiment 3 is reduced by more than 10% and 18% respectively, which shows that the disclosure can reduce the release of radioactive substances $^{89}$Sr and $^{90}$Sr, so as to improve the safety of nuclear power plant in case of a severe accident.

Although the slump flow, 28-day compressive strength, relative residual compressive strength and decomposition enthalpy of the sacrificial concrete decrease slightly with the increase of strontium oxide content, parameters of the sacrificial concrete prepared by the disclosure are still greatly improved compared with the prior art. In addition, with the increase of strontium oxide content, the release of radioactive substances $^{89}$Sr and $^{90}$Sr can be gradually reduced, so as to improve the safety of nuclear power plants in case of the severe accident. It can be seen from the results of the three illustrated embodiments that the disclosure has made substantial progress.

In addition, it should be noted that the illustrated embodiments are only used to illustrate the technical solution of the disclosure. If those skilled in the related art modifies or equivalent replaces the technical solution of the disclosure without departing from the purpose of the disclosure, it shall be covered within the scope of the claims of the disclosure.

Moreover, reasons for the decrease of melting rate due to the increase of decomposition enthalpy of the sacrificial concrete are described as follow.

According to heat transfer theory, a relationship between the melting rate of the sacrificial concrete and the heat flux transmitted to the inside of the sacrificial concrete is expressed as the following formula:

$$V = Q/(p \times A \times \Delta H) \quad (1)$$

where V is the melting rate of the sacrificial concrete, Q is the heat flux transmitted to the inside of sacrificial concrete, A is the melting area of the sacrificial concrete, and Δh is the decomposition enthalpy of the sacrificial concrete.

It can be seen from the above-mentioned formula (1) that the melting rate of sacrificial concrete is inversely proportional to its decomposition enthalpy, which indicates that when the decomposition enthalpy of the sacrificial concrete increases, the melting rate of the sacrificial concrete decreases.

What is claimed is:

1. A sacrificial concrete for a core catcher, comprising raw materials in parts by weight as follows:
   cement, 575~625 parts;
   a quartz sand, 1200~1300 parts;
   a hematite ore, 700~800 parts;
   water, 200~220 parts;
   a water reducing agent, 7~10 parts; and
   strontium oxide (SrO), 5~10 parts;
   wherein the water is tap water or drinking water, and the water meets requirements of Chinese "standard of water for concrete" of JGJ63-2006;
   wherein the water reducing agent is a polycarboxylate superplasticizer, an appearance of the polycarboxylate superplasticizer is in a range from colorless to light yellow, a density of the polycarboxylate superplasticizer is in a range of 1.05~1.15 grams per milliliter (g/ml), a solid content of the polycarboxylate superplasticizer by mass is greater than or equal to 40%, a pH value of the polycarboxylate superplasticizer is 4±2, and a water reducing rate of the polycarboxylate superplasticizer is greater than or equal to 30%;

wherein a preparation method of the sacrificial concrete comprises:

step (1), mixing the cement, the quartz sand and the strontium oxide evenly to obtain a mixed material M1;

step (2), adding the hematite ore into the mixed material M1 and stirring to obtain a uniform mixed material M2; and step (3), adding a mixed solution of the water and the water reducing agent into the uniform mixed material M2 and stirring to obtain a uniform mixed material M3, and then molding and curing to thereby obtain the sacrificial concrete for a core catcher.

2. The sacrificial concrete according to claim 1, wherein the cement is aluminate cement with an aluminium oxide ($Al_2O_3$) content greater than or equal to 75% and a silicon dioxide ($SiO_2$) content less than or equal to 0.5%.

3. The sacrificial concrete according to claim 1, wherein the quartz sand is quartz powder with a silicon dioxide content greater than or equal to 99% and a particle size greater than 0 millimeter (mm) and less than or equal to 5 mm.

4. The sacrificial concrete according to claim 1, wherein a ferric trioxide ($Fe_2O_3$) content of the hematite ore is greater than or equal to 92%, and a particle size of the hematite ore is 5 mm~8 mm.

5. The sacrificial concrete according to claim 1, wherein the strontium oxide is powder with a strontium oxide content greater than or equal to 95%.

6. The sacrificial concrete according to claim 1, wherein the step (1) specifically comprises: adding the cement, the quartz sand and the strontium oxide into a single horizontal shaft forced concrete mixer; and controlling a stirring speed as 40~50 revolutions per minute (rpm) and a stirring time as 5~8 minutes (min), to thereby obtain the mixed material M1;

the step (2) specifically comprises: adding the hematite ore into the mixed material M1, and controlling a stirring time as 6~8 min, to thereby obtain the mixed material M2; and the step (3) specifically comprises: mixing half of the water with all of the water reducing agent firstly and stirring evenly to obtain a uniform mixed solution, and then adding the uniform mixed solution into the mixed material M2; using the other half of the water to clean a container containing the water reducing agent and then add into the mixed material M2, and controlling a mixing time as 8~12 min; and then performing the molding and curing to thereby obtain the sacrificial concrete.

* * * * *